(12) United States Patent
Liu et al.

(10) Patent No.: US 12,449,123 B2
(45) Date of Patent: Oct. 21, 2025

(54) OUTDOOR INVISIBLE-IGNITION BURNER

(71) Applicant: Guangzhou RedSun Gas Appliances Co., Ltd, Guangdong (CN)

(72) Inventors: Yanchun Liu, Guangdong (CN); Hong Fang, Guangdong (CN); Xiaowen Chen, Guangdong (CN)

(73) Assignee: Guangzhou RedSun Gas Appliances Co., Ltd, Guangzhou (CN)

( * ) Notice: Subject to any disclaimer, the term of this patent is extended or adjusted under 35 U.S.C. 154(b) by 414 days.

(21) Appl. No.: 18/200,583

(22) Filed: May 23, 2023

(65) Prior Publication Data

US 2024/0191873 A1 Jun. 13, 2024

(30) Foreign Application Priority Data

Dec. 10, 2022 (CN) .......................... 202211583093.6

(51) Int. Cl.
*F23D 14/58* (2006.01)
*F23D 14/70* (2006.01)

(52) U.S. Cl.
CPC ............ *F23D 14/58* (2013.01); *F23D 14/70* (2013.01); *F23D 2203/105* (2013.01); *F23D 2207/00* (2013.01); *F23D 2900/14003* (2013.01)

(58) Field of Classification Search
CPC .... F23D 14/70; F23D 14/58; F23D 2203/105; F23D 2207/00; F23D 2900/14003
See application file for complete search history.

(56) References Cited

U.S. PATENT DOCUMENTS

| | | | | |
|---|---|---|---|---|
| 5,219,802 | A * | 6/1993 | Hsiao | C04B 33/13 501/81 |
| 2014/0248570 | A1* | 9/2014 | Zhang | F23N 5/12 431/328 |
| 2016/0116161 | A1* | 4/2016 | Liu | F23D 14/145 431/329 |

\* cited by examiner

*Primary Examiner* — Alfred Basichas (57) ABSTRACT

An outdoor invisible-ignition burner comprises a furnace which is circumferentially enclosed, wherein a porous ceramic plate is disposed at the top of the furnace and is fixedly mounted at an opening in the top of the furnace through a decoration ring, an ignition needle connected with a high-tension ignition wire is fixed on an outer wall of the furnace, a jet tube is disposed in the furnace, one end of the jet tube stretches out of the furnace and is connected with a main gas tube through a main nozzle, an auxiliary nozzle is mounted at the bottom of the furnace and stretches into the furnace, a gas outlet end of the auxiliary nozzle is located below the ignition needle, and a gas inlet end of the auxiliary nozzle is connected with a side wall of the main nozzle through an auxiliary gas tube.

18 Claims, 6 Drawing Sheets

OUTDOOR INVISIBLE-IGNITION BURNER

CROSS REFERENCE TO RELATED APPLICATIONS

The present application claims the benefit of Chinese Patent Application No. 202211583093.6 filed on Dec. 10, 2022, the contents of which are incorporated herein by reference in their entirety.

BACKGROUND OF THE INVENTION

1. Technical Field

The invention belongs to the field of outdoor cookware, and particularly relates to an outdoor invisible-ignition burner.

2. Description of Related Art

With the continuous improvement of science and technology, outdoor infrared gas stoves have an increasingly higher market share and are gradually accepted by customers. Existing outdoor infrared gas stoves adopt an infrared radiation burner, which is a low-tension jet-type fully aerated burner.

Because infrared gas burners have a large primary air coefficient and the furnace chamber where gas and primary air are mixed is relatively large, air in the furnace chamber of the burners needs to be completely discharged to realize normal ignition and combustion. It is difficult to directly ignite the gas-air mixture overflowing from a porous ceramic plate with pulse sparks or piezoelectric ceramic sparks, and a detonation may be caused. Generally, a main burner is ignited by an ignition burner through an ignition nozzle to realize ignition.

Moreover, the ignition burner of outdoor infrared gas stoves is mounted outside the infrared main burner, and comprises a burner center outside the burner, a bottom portion or an outer portion, and is tilted upwards by a certain angle. Gas enters an ignition support through the ignition nozzle to be mixed with part of air, the mixture of gas and air is ignited on the ignition support by means of an electric ignition spark to form a flame, which is then ejected to the main burner to ignite the main burner.

At present, the ignition structure and operating method of burners on the market have the following defects:

(1) By adopting a peripheral flame ignition scheme for igniting the burner on the periphery of the burner, a certain distance should be kept between the burner and a soup plate or stove surface, which may otherwise affect the ignition of the main burner by an ignition flame; this structure has an obvious influence on the appearance of the burner, and makes the burner have no competitiveness and market value; the decorative panel or stove surface around the burner may be burnt black by the large ignition flame and a large quantity of carbon deposits which are not burnt completely, thus seriously affecting the appearance of the burner;

(2) By adopting an external flame ignition scheme based on an ignition nozzle disposed at the bottom of a burner, the main burner is ignited through a central channel of the burner, and at the moment the ignition burner is ignited, the flame spurting out may be blocked by a flame guide plate and return, leading to burning in front of the ignition nozzle, so poor ignition or a detonation may be caused if the flame cannot reach a main flame hole or a main flame plate;

(3) By adopting the external flame ignition scheme based on the ignition nozzle disposed at the bottom of the burner, the main burner is ignited through the central channel of the burner, and the diameter of the central channel is limited, so resistance will be generated when the ignition flame propagates; when the gas pressure of a pipe network is low, the ignition frame will not be able to overcome the resistance to reach the main flame hole, leading to a failure of ignition; when the gas pressure of the pipe network is high, air in the central channel will be quickly discharged by smoke generated by the ignition flame, and there is no oxygen in the channel to restrict the transmission of the flame;

(4) By adopting the external flame ignition scheme based on the ignition nozzle disposed at the bottom of the burner, the main burner is ignited through the central channel of the burner, and the central channel is small, so the ignition flame is often large and black and shows obvious incomplete combustion; when the mixture of gas of the main burner and air reaches the surface of the main flame hole, the concentration is low, the ignition flame will led to the bottom of the burner if it is not ignited at the moment of ignition, and under the inertia effect of the flame, the ignition flame cannot be maintained on the surface or side face of the main flame hole, so the burner cannot be ignited normally;

(5) By adopting the external flame ignition scheme based on the ignition nozzle disposed at the bottom of the burner, the ignition nozzle and the ignition support are complex in structure and are mounted at the bottom of the burner or the narrow space of the central channel, so installation is difficult, and the installation reliability and accuracy are low, leading to poor ignition performance of the burner;

(6) When a scheme of direct ignition on the upper surface of an infrared combustion radiation plate through ignition sparks is used, because the cavity of an infrared burner has a large size, it takes a long time to completely discharge air in the cavity by means of the mixture of gas and air; the gas concentration is low, so ignition is difficult, the ignition rate is low, and it is difficult to realize normal ignition especially in case of piezoelectric ceramic ignition.

Thus, it becomes a big technical problem to design and change the burner structure to realize an aesthetic appearance and reliable ignition of burners in the design of outdoor and commercial infrared gas burners at present.

In view of this, it is necessary to make a further improvement to the structure of existing outdoor invisible-ignition burners.

BRIEF SUMMARY OF THE INVENTION

The invention mainly aims to provide an outdoor invisible-ignition burner.

An outdoor invisible-ignition burner, comprising a furnace which is circumferentially enclosed, wherein a porous ceramic plate is disposed at a top of the furnace and is fixedly mounted at an opening in the top of the furnace through a decoration ring, an ignition needle connected with a high-tension ignition wire is fixed on an outer wall of the furnace, a jet tube is disposed in the furnace, an end of the jet tube stretches out of the furnace and allows a main nozzle to be inserted therein, the main nozzle is connected with a main gas tube, an auxiliary nozzle is mounted at a bottom of the furnace and stretches into the furnace, a gas outlet end of the auxiliary nozzle is located below the ignition needle, and a gas inlet end of the auxiliary nozzle is connected with a side wall of the main nozzle through an auxiliary gas tube.

In a preferred solution of the invention, a ceramic needle assembly is connected to an outer wall of the decoration ring, the ignition needle is located at an end of the ceramic needle assembly, the decoration ring is connected with the high-tension ignition wire located below the ignition needle, and the high-tension ignition wire is connected with a controller.

In a preferred solution of the invention, a gas outlet end of the jet tube stretches into the furnace and is connected with a diverting plate.

In a preferred solution of the invention, the diverting plate is connected to and mounted around an opening of the jet tube, extends upwards from the gas outlet end of the jet tube, and is fixed in the furnace through screws, and gaps are reserved between two sides of the diverting plate and an inner wall of the furnace.

In a preferred solution of the invention, the auxiliary nozzle is arranged vertically upwards and is connected with a guide plate which bends and extends to a position above the auxiliary nozzle, and a groove or circular hole is formed in the guide plate located right above the auxiliary nozzle.

In a preferred solution of the invention, an end of the guide plate bends and extends out of an outer circumference of the auxiliary nozzle and covers a top of the axially nozzle, the groove or circular hole is a strip-shaped slit formed in an extension direction of the guide plate, and a connecting line of the auxiliary nozzle and the ignition needle penetrates through the groove or circular hole.

In a preferred solution of the invention, the bottom of the furnace inclines upwards from a far end of the main nozzle to a side where the main nozzle is located, and a bottom of the side, where the main nozzle is located, of the furnace is concaved towards an interior of the furnace to form a mounting portion used for mounting the auxiliary nozzle.

In a preferred solution of the invention, the auxiliary nozzle is machined from a hexagonal section, and secondary air holes are formed in six sides of the auxiliary nozzle and are communicated with an interior of the auxiliary nozzle.

In a preferred solution of the invention, the main nozzle is machined from hexagonal section, and secondary air holes are formed in six sides of the main nozzle and are communicated with an interior of the main nozzle.

In a preferred solution of the invention, the main nozzle is fixed at a gas inlet end of the jet tube through a nozzle holder, and the main gas tube and the auxiliary gas tube are connected to the main nozzle in parallel and are communicated with each other.

By adopting one of the above technical solutions, the invention has at least one of the following advantages or beneficial effects:

The main gas tube of the outdoor invisible-ignition burner is connected with both the main nozzle and the auxiliary nozzle, the main nozzle is connected with the main gas tube and sprays gas into the furnace through the jet tube, the auxiliary nozzle synchronously stretches out from the bottom of the furnace to spray gas upwards into the furnace, the ignition needle located above the auxiliary nozzle is used for ignition, and the infrared burner is simple and aesthetic in structure, and can realize ignition more quickly and efficiently.

BRIEF DESCRIPTION OF THE SEVERAL VIEWS OF THE DRAWINGS

The invention will be further described below in conjunction with drawings and embodiments.

DETAILED DESCRIPTION OF THE INVENTION

Many different embodiments or examples are provided below to implement different solutions of the invention.

As shown in FIG. 1-FIG. 7, the invention provides an outdoor invisible-ignition burner, which comprises a furnace 100 which is circumferentially enclosed, wherein a porous ceramic plate 200 is disposed at the top of the furnace 100 and is fixedly mounted at an opening in the top of the furnace 100 through a decoration ring 130, an ignition needle 310 connected with a high-tension ignition wire 320 is fixed on an outer wall of the furnace 100, a jet tube 110 is disposed in the furnace 100, one end of the jet tube 110 stretches out of the furnace 100 and allows a main nozzle 111 to be inserted therein, the end, stretching out of the furnace 100, of the jet tube 110 is connected with a main gas tube 112 through the main nozzle 111, an auxiliary nozzle 120 is mounted at the bottom of the furnace 100 and stretches into the furnace 100, a gas outlet end of the auxiliary nozzle 120 is located below the ignition needle 310, and a gas inlet end of the auxiliary nozzle 120 is connected with a side wall of the main nozzle 111 through an auxiliary gas tube 121.

Figure 1:
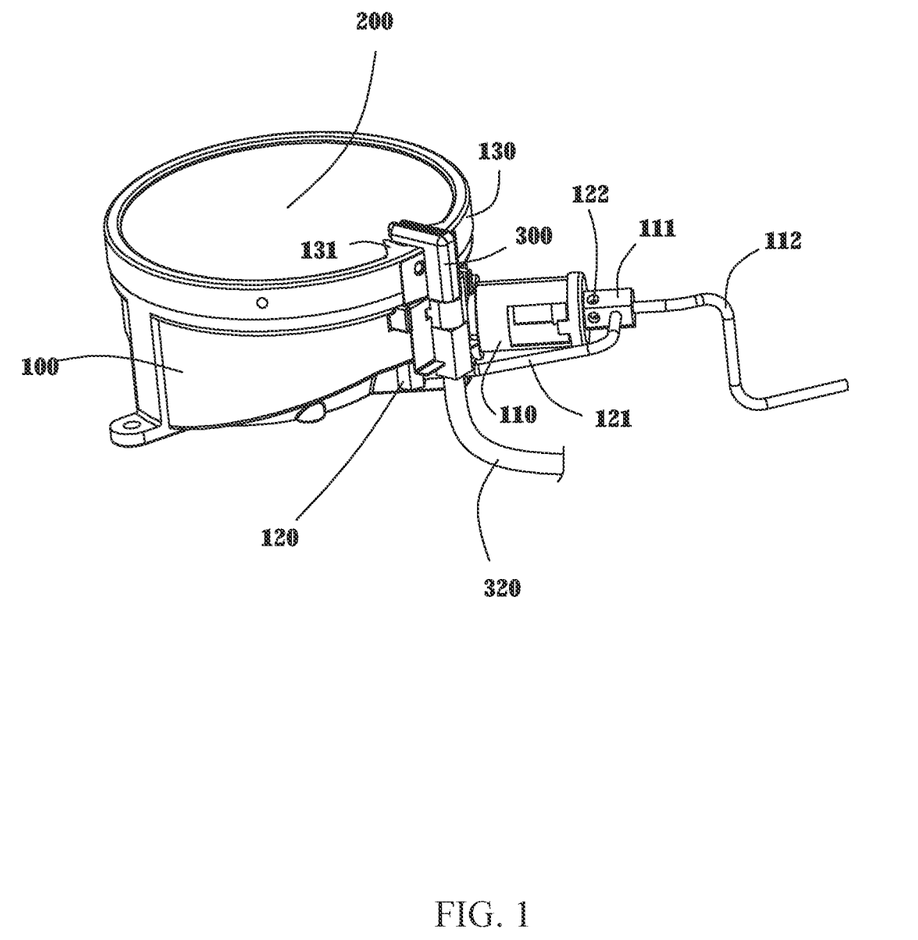
FIG. 1 is an overall structural view of an outdoor invisible-ignition burner according to one embodiment of the invention.
Figure 2:
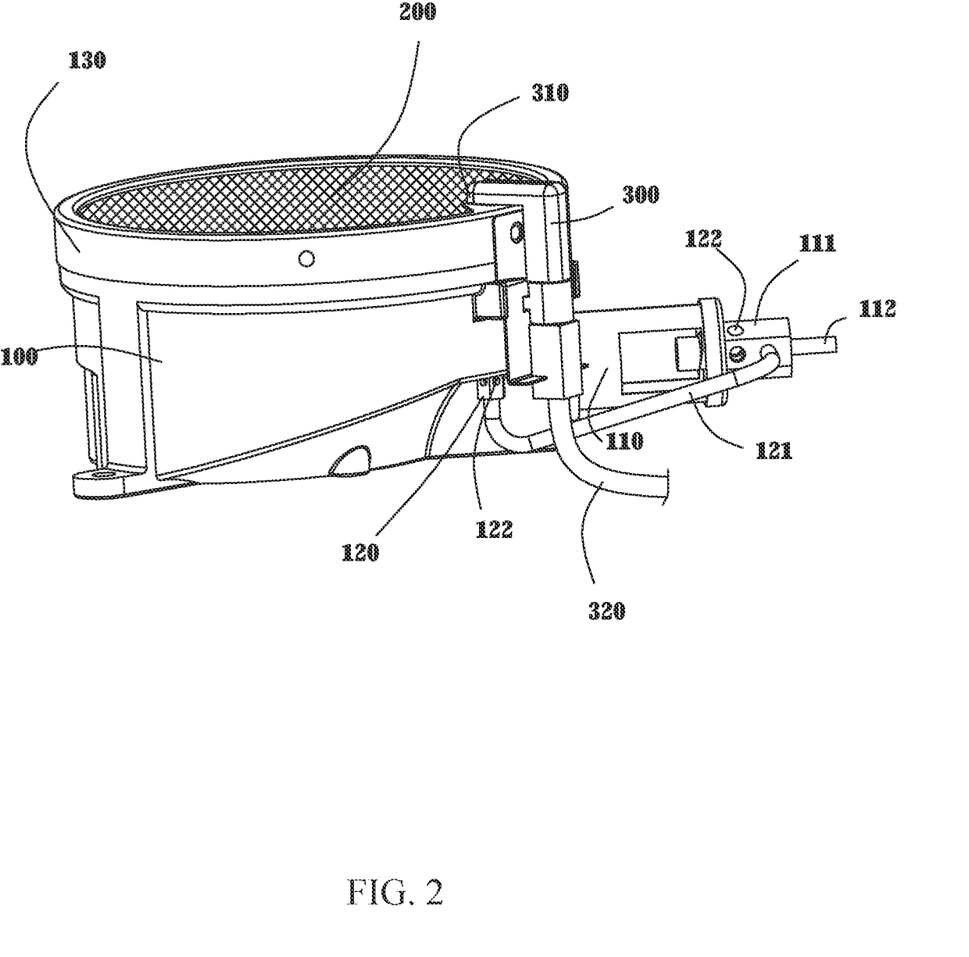
FIG. 2 is a structural view of a furnace of the outdoor invisible-ignition burner according to one embodiment of the invention.
Figure 3:
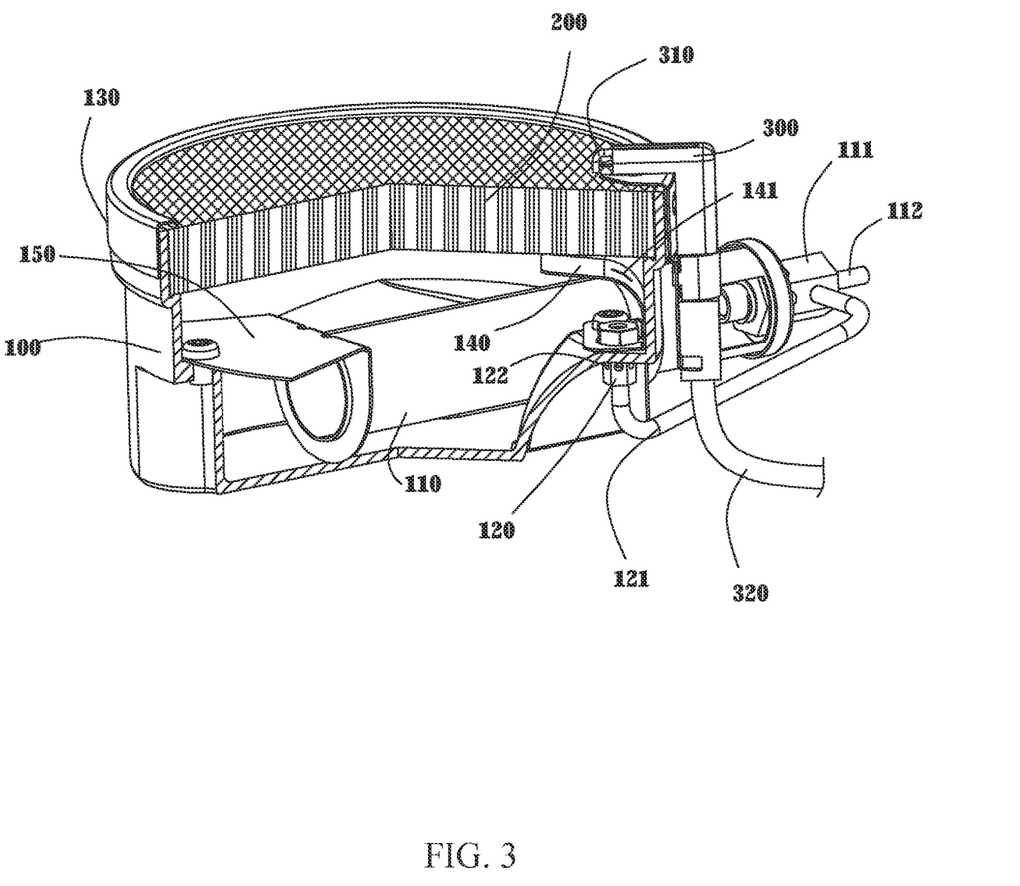
FIG. 3 is an internal sectional structural view of the furnace of the outdoor invisible-ignition burner according to one embodiment of the invention.

The main gas tube 112 of the outdoor invisible-ignition burner is connected with both the main nozzle 111 and the auxiliary nozzle 120, the main nozzle 111 is connected with the main gas tube 112 and sprays gas into the furnace 100 through the jet tube 110, the main gas tube 112 is connected with a controller, whether gas is supplied or cut off is controlled through the controller, the auxiliary nozzle 120 synchronously stretches out from the bottom of the furnace 100 to spray gas upwards into the furnace 100, and the ignition needle 310 located above the auxiliary nozzle 120 is used for ignition. The infrared burner is simple and aesthetic in structure, and can realize ignition more quickly and efficiently.

Figure 4:
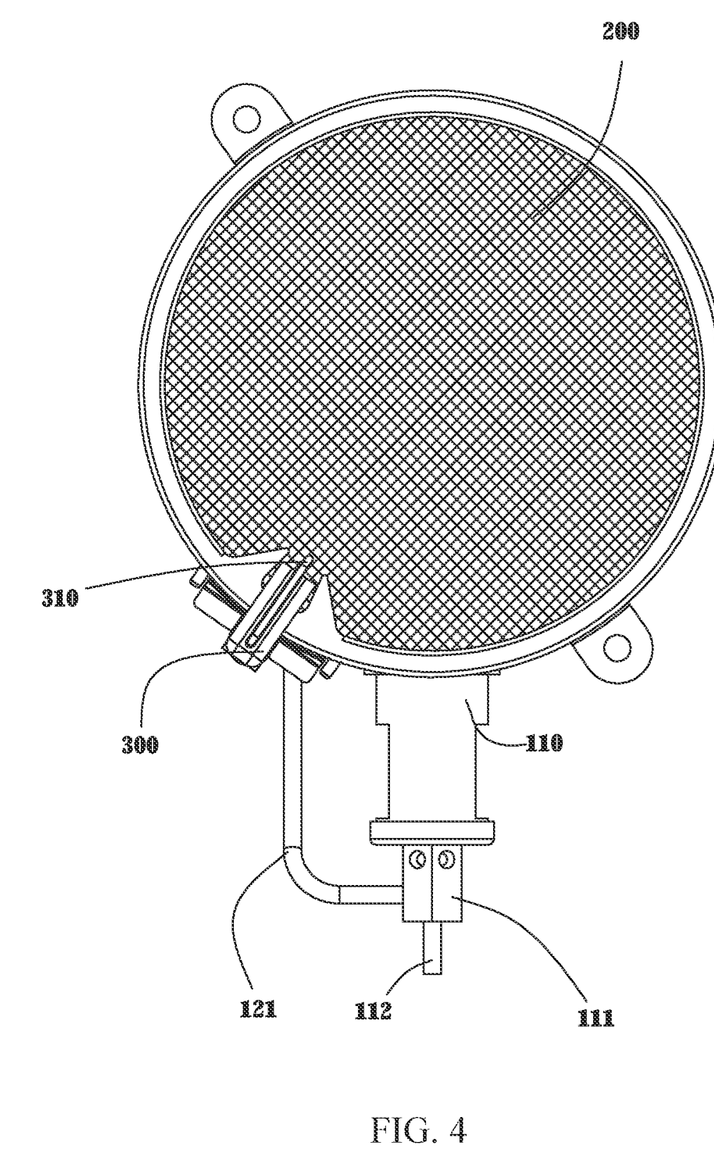
FIG. 4 is a top structural view of the outdoor invisible-ignition burner according to one embodiment of the invention.

In some embodiments of the invention, a ceramic needle assembly 300 is connected to an outer wall of the decoration ring 130, the ignition needle 310 is located at an end of the ceramic needle assembly 300, the decoration ring 130 is connected with the high-tension ignition wire 320 located below the ignition needle 310, and the high-tension ignition wire 320 is connected with the controller.

Figure 6:
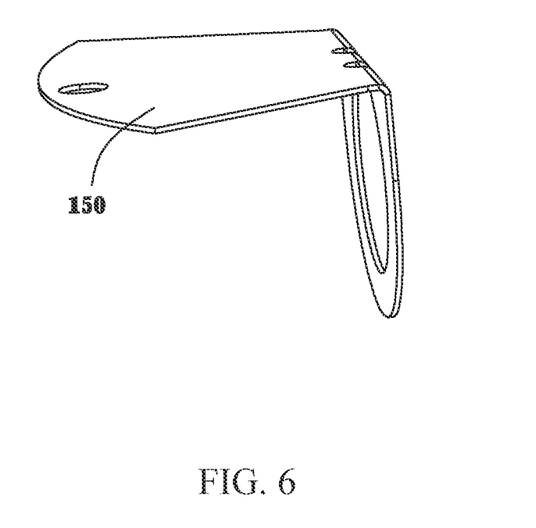
FIG. 6 is a structural view of a diverting plate of the outdoor invisible-ignition burner according to one embodiment of the invention.

In some embodiments of the invention, a gas outlet end of the jet tube 110 stretches into the furnace 100 and is connected with a diverting plate 150.

Figure 7:
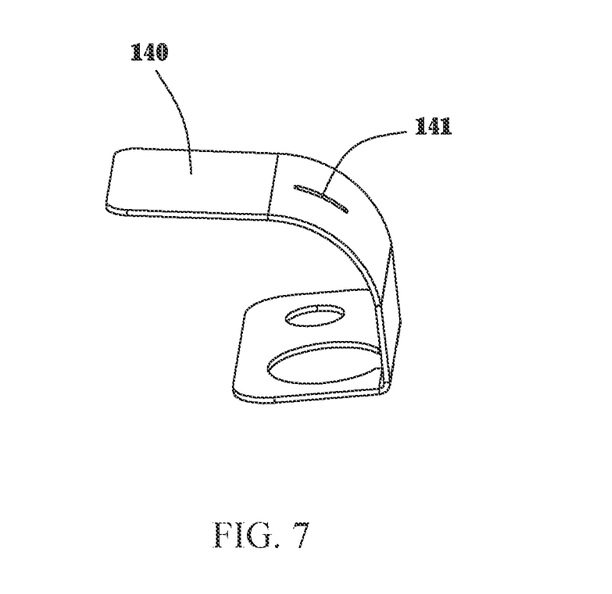
FIG. 7 is a structural view of a guide plate of the outdoor invisible-ignition burner according to one embodiment of the invention.

In some embodiments of the invention, the diverting plate 150 is connected to and mounted around an opening of the jet tube 110, extends upwards from the gas outlet end of the jet tube 110, and is fixed in the furnace 100 through screws, and gaps are reserved between two sides of the diverting plate 150 and an inner wall of the furnace 100. The diverting plate 150 is disposed at the gas outlet end, inserted into the furnace 100, of the jet tube 110, mounted below the porous ceramic plate 200, and fixed in the furnace 100 (the outlet end, namely the front end, of the jet tube 110) through screws, and the mixture of gas and air flows out from the gas outlet end of the jet tube 110, is uniformly diverted into the furnace 100 through the diverting plate 150, and uniformly overflows from the porous ceramic plate 200. The main gas tube 112 and the auxiliary gas tube 121 are connected to the main nozzle 111 in parallel and are communicated with each other, that is, gas entering the main gas tube 112 synchronously flows through the auxiliary gas tube 121 to reach the auxiliary nozzle 120. A guide plate is disposed at an upper end of the auxiliary nozzle 120, the guide plate is provided with a groove or circular hole and abuts against the furnace 100 through screws, part of the mixture sprayed out of the auxiliary nozzle 120 flows into the furnace 100 through the guide plate, is mixed with the mixture sprayed out of the jet tube 110, and overflows through the porous ceramic plate 200, and the other part of the mixture is sprayed out of the porous ceramic plate 200 through the groove or circular hole in the guide plate.

In some embodiments of the invention, the auxiliary nozzle 120 is arranged vertically upwards and is connected with a guide plate 140 which bends and extends to a position above the auxiliary nozzle 120, and a groove 141 or circular hole is formed in the guide plate 140 located right above the auxiliary nozzle 120.

In some embodiments of the invention, one end of the guide plate 140 bends and extends out of an outer circumference of the auxiliary nozzle 120 and covers the top of the axially nozzle 120, the groove 141 or circular hole is a strip-shaped slit formed in the extension direction of the guide plate 140, and a connecting line of the auxiliary nozzle 120 and the ignition needle 310 penetrates through the groove 141 or circular hole.

In some embodiments of the invention, the bottom of the furnace 100 inclines upwards from a far end of the main nozzle 111 to a side where the main nozzle 111 is located, and the bottom of the side, where the main nozzle 111 is located, of the furnace 100 is concaved towards the interior of the furnace 100 to form a mounting portion used for mounting the auxiliary nozzle 120. An external thread is disposed at a front end of the auxiliary nozzle 120, and the external thread of the auxiliary nozzle 120 penetrates through the furnace 100 and abuts against the furnace 100 through a locking nut.

Figure 5:
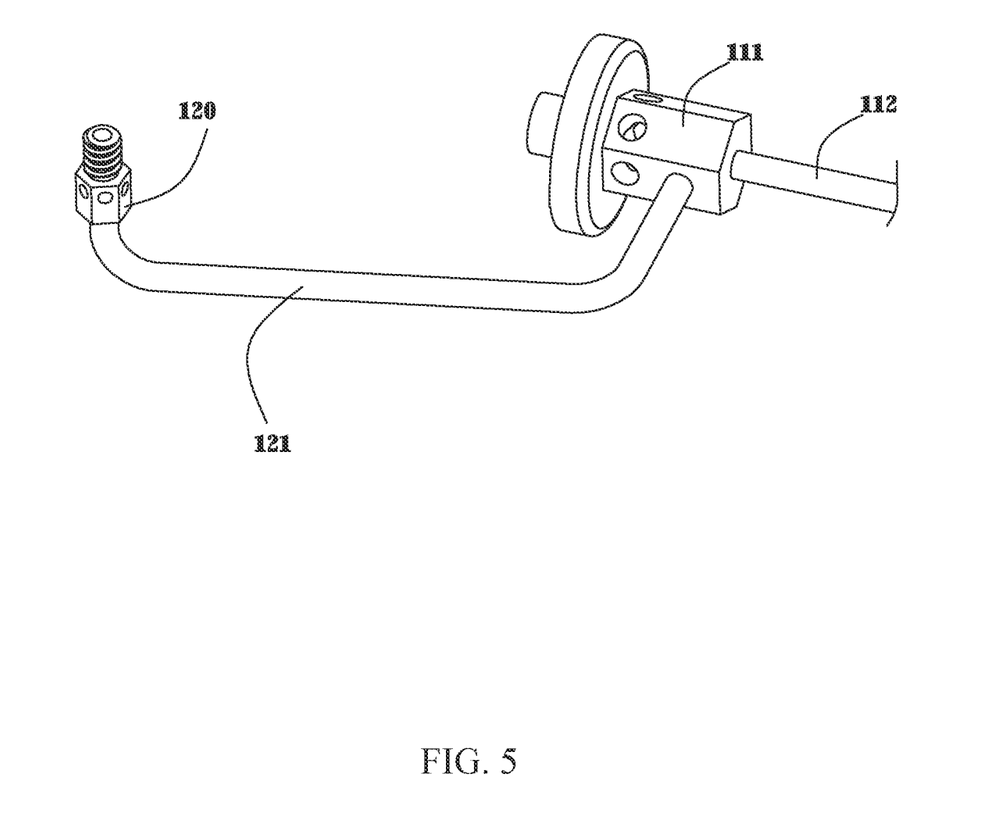
FIG. 5 is a connection diagram of a main nozzle and an auxiliary nozzle of the outdoor invisible-ignition burner according to one embodiment of the invention.

In some embodiments of the invention, the auxiliary nozzle 120 is machined from a hexagonal section, secondary air holes 122 are formed in six sides of the auxiliary nozzle 120 and are communicated with the interior of the auxiliary nozzle 120, the main nozzle 111 is machined from hexagonal section, and secondary air holes 122 are formed in six sides of the main nozzle 111 and are communicated with the interior of the main nozzle 111. When gas is sprayed out of the main nozzle 111, part of air can be introduced into the main nozzle 111 through the secondary air holes 122, so the air input is increased, which is beneficial to gas and air mixing. Moreover, when gas is sprayed out of the auxiliary nozzle 120, part of air can be introduced into the auxiliary nozzle 120, so the air input is increased, which is beneficial to gas and air mixing.

In some embodiments of the invention, the main nozzle 111 is fixed at a gas inlet end of the jet tube 110 through a nozzle holder, and the main gas tube 112 and the auxiliary gas tube 121 are connected to the main nozzle 111 in parallel and are communicated with each other. The main nozzle 111 is fixed at the gas inlet end of the jet tube 110 through the nozzle holder, gas is injected into the jet tube 110 through the main nozzle 111, and part of air is introduced into the jet tube 110 through an air door, and the mixture of gas and air flows out from the gas outlet end of the jet tube 110.

The outdoor invisible-ignition burner comprises a furnace 100 and an auxiliary nozzle 120 disposed on the furnace 100, a jet tube 110 is inserted into the furnace 100, a diverting plate 150 is disposed at a gas outlet end of the jet tube 110, a main nozzle 111 is disposed at a gas inlet end of the jet tube 110 and is connected with one end of an auxiliary gas tube 121, the other end of the auxiliary gas tube 121 is connected with the auxiliary nozzle 120, a guide plate 140 is disposed at a gas outlet end of the auxiliary nozzle 120, an upper end of the furnace 100 abuts against a porous ceramic plate 200, the furnace 100 and the porous ceramic plate 200 are connected through a decoration ring 130, a ceramic needle assembly 300 is disposed on an outer side of the decoration ring 130 and is connected with a high-tension ignition wire 320, and an ignition needle 310 of the ceramic needle assembly 300 and an electrode 131 of the decoration ring 130 generate sparks through high-tension discharge. The auxiliary nozzle 120 penetrates through the furnace 100 from bottom to top and is disposed below the ignition needle 310 of the ceramic needle assembly 300 and the electrode 131, and the high-tension sparks ignite gas, which is sprayed by the auxiliary nozzle 120 to the porous ceramic plate 200 through a groove 141 or circular hole in the guide plate 140 and overflows from the porous ceramic plate 200; due to the fact that air in the furnace 100 is not completely discharged at this moment, the combustible mixture of air and gas sprayed by the main nozzle 111 cannot be directly ignited by the high-tension sparks, and a burning flame instantly ignites the mixture, which is sprayed by the main nozzle 111 into the furnace 100 through the jet tube 110 and overflows from the porous ceramic plate 200, such that infrared burner ignition is realized.

Although the embodiments of the invention have been illustrated and described, those ordinarily skilled in the art can understand that many variations, modifications, substitutions and transformations can be made to these embodiments without departing from the principle and purpose of the invention. The scope of the invention is defined by the claims and their equivalents.

What is claimed is:

1. An outdoor invisible-ignition burner, comprising a furnace which is circumferentially enclosed, wherein a porous ceramic plate is disposed at a top of the furnace and is fixedly mounted at an opening in the top of the furnace through a decoration ring, an ignition needle connected with a high-tension ignition wire is fixed on an outer wall of the furnace, a jet tube is disposed in the furnace, an end of the jet tube stretches out of the furnace and allows a main nozzle to be inserted therein, the main nozzle is connected with a main gas tube, an auxiliary nozzle is mounted at a bottom of the furnace and stretches into the furnace, a gas outlet end of the auxiliary nozzle is located below the ignition needle, and a gas inlet end of the auxiliary nozzle is connected with a side wall of the main nozzle through an auxiliary gas tube.

2. The outdoor invisible-ignition burner according to claim 1, wherein a ceramic needle assembly is connected to an outer wall of the decoration ring, the ignition needle is located at an end of the ceramic needle assembly, the decoration ring is connected with the high-tension ignition wire located below the ignition needle, and the high-tension ignition wire is connected with a controller.

3. The outdoor invisible-ignition burner according to claim 1, wherein a gas outlet end of the jet tube stretches into the furnace and is connected with a diverting plate.

4. The outdoor invisible-ignition burner according to claim 3, wherein the diverting plate is connected to and mounted around an opening of the jet tube, extends upwards from the gas outlet end of the jet tube, and is fixed in the furnace through screws, and gaps are reserved between two sides of the diverting plate and an inner wall of the furnace.

5. The outdoor invisible-ignition burner according to claim 1, wherein the auxiliary nozzle is arranged vertically upwards and is connected with a guide plate which bends and extends to a position above the auxiliary nozzle, and a groove or circular hole is formed in the guide plate located right above the auxiliary nozzle.

6. The outdoor invisible-ignition burner according to claim 5, wherein an end of the guide plate bends and extends out of an outer circumference of the auxiliary nozzle and covers a top of the axially nozzle, the groove or circular hole is a strip-shaped slit formed in an extension direction of the guide plate, and a connecting line of the auxiliary nozzle and the ignition needle penetrates through the groove or circular hole.

7. The outdoor invisible-ignition burner according to claim 5, wherein the bottom of the furnace inclines upwards from a far end of the main nozzle to a side where the main nozzle is located, and a bottom of the side, where the main nozzle is located, of the furnace is concaved towards an interior of the furnace to form a mounting portion used for mounting the auxiliary nozzle.

8. The outdoor invisible-ignition burner according to claim 5, wherein the auxiliary nozzle is machined from a hexagonal section, and secondary air holes are formed in six sides of the auxiliary nozzle and are communicated with an interior of the auxiliary nozzle.

9. The outdoor invisible-ignition burner according to claim 5, wherein the main nozzle is machined from hexagonal section, and secondary air holes are formed in six sides of the main nozzle and are communicated with an interior of the main nozzle.

10. The outdoor invisible-ignition burner according to claim 9, wherein the main nozzle is fixed at a gas inlet end of the jet tube through a nozzle holder, and the main gas tube and the auxiliary gas tube are connected to the main nozzle in parallel and are communicated with each other.

11. The outdoor invisible-ignition burner according to claim 2, wherein a gas outlet end of the jet tube stretches into the furnace and is connected with a diverting plate.

12. The outdoor invisible-ignition burner according to claim 11, wherein the diverting plate is connected to and mounted around an opening of the jet tube, extends upwards from the gas outlet end of the jet tube, and is fixed in the furnace through screws, and gaps are reserved between two sides of the diverting plate and an inner wall of the furnace.

13. The outdoor invisible-ignition burner according to claim 2, wherein the auxiliary nozzle is arranged vertically upwards and is connected with a guide plate which bends and extends to a position above the auxiliary nozzle, and a groove or circular hole is formed in the guide plate located right above the auxiliary nozzle.

14. The outdoor invisible-ignition burner according to claim 13, wherein an end of the guide plate bends and extends out of an outer circumference of the auxiliary nozzle and covers a top of the axially nozzle, the groove or circular hole is a strip-shaped slit formed in an extension direction of the guide plate, and a connecting line of the auxiliary nozzle and the ignition needle penetrates through the groove or circular hole.

15. The outdoor invisible-ignition burner according to claim 13, wherein the bottom of the furnace inclines upwards from a far end of the main nozzle to a side where the main nozzle is located, and a bottom of the side, where the main nozzle is located, of the furnace is concaved towards an interior of the furnace to form a mounting portion used for mounting the auxiliary nozzle.

16. The outdoor invisible-ignition burner according to claim 13, wherein the auxiliary nozzle is machined from a hexagonal section, and secondary air holes are formed in six sides of the auxiliary nozzle and are communicated with an interior of the auxiliary nozzle.

17. The outdoor invisible-ignition burner according to claim 13, wherein the main nozzle is machined from hexagonal section, and secondary air holes are formed in six sides of the main nozzle and are communicated with an interior of the main nozzle.

18. The outdoor invisible-ignition burner according to claim 17, wherein the main nozzle is fixed at a gas inlet end of the jet tube through a nozzle holder, and the main gas tube and the auxiliary gas tube are connected to the main nozzle in parallel and are communicated with each other.

* * * * *